United States Patent
Kleinhoffer et al.

(10) Patent No.: US 10,023,037 B2
(45) Date of Patent: Jul. 17, 2018

(54) VACUUM BLOCKER

(71) Applicants: Richard Kleinhoffer, Bruce, MI (US); Cliff R Reitzloff, Northville, MI (US)

(72) Inventors: Richard Kleinhoffer, Bruce, MI (US); Cliff R Reitzloff, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 53 days.

(21) Appl. No.: 15/367,273

(22) Filed: Dec. 2, 2016

(65) Prior Publication Data

US 2017/0080792 A1 Mar. 23, 2017

Related U.S. Application Data

(63) Continuation of application No. 14/635,414, filed on Mar. 2, 2015.

(60) Provisional application No. 61/946,112, filed on Feb. 28, 2014.

(51) Int. Cl.

| | |
|---|---|
| *B60J 7/043* | (2006.01) |
| *B60J 10/90* | (2016.01) |
| *B60J 7/12* | (2006.01) |
| *B60J 7/06* | (2006.01) |
| *B60J 7/00* | (2006.01) |
| *B60J 10/24* | (2016.01) |
| *B60J 10/27* | (2016.01) |
| *B60J 10/32* | (2016.01) |
| *B60J 10/40* | (2016.01) |
| *B60J 10/82* | (2016.01) |
| *B60J 10/30* | (2016.01) |

(52) U.S. Cl.
CPC ............. *B60J 10/90* (2016.02); *B60J 7/0046* (2013.01); *B60J 7/061* (2013.01); *B60J 7/12* (2013.01); *B60J 10/24* (2016.02); *B60J 10/27* (2016.02); *B60J 10/30* (2016.02); *B60J 10/32* (2016.02); *B60J 10/40* (2016.02); *B60J 10/82* (2016.02)

(58) Field of Classification Search
CPC ... B60J 10/90; B60J 10/24; B60J 10/27; B60J 10/30; B60J 10/32; B60J 10/40; B60J 10/82; B60J 7/0046; B60J 7/061; B60J 7/12
See application file for complete search history.

(56) References Cited

U.S. PATENT DOCUMENTS

| | | | | |
|---|---|---|---|---|
| 4,272,121 A | * | 6/1981 | Kim ..................... | B60J 7/041 224/309 |
| 5,018,783 A | * | 5/1991 | Chamings ............ | B60J 7/064 296/217 |
| 5,152,577 A | * | 10/1992 | Omoto ................. | B60J 7/064 296/219 |

(Continued)

*Primary Examiner* — Lori L Lyjak
(74) *Attorney, Agent, or Firm* — Ralph E. Smith

(57) ABSTRACT

A vacuum blocker for a movable roof panel is provided and moves between an open position and a closed position and between a seated position and a lifted position when in the closed position relative to an opening formed in a fixed roof panel of a vehicle. A seal member is supported by the fixed roof panel and forms a first seal at a junction of the fixed roof panel and the movable roof panel when the movable roof panel is in the seated position. A flap extends between the seal member and the movable roof panel and forms a second seal at a junction of the seal member and the movable roof panel when the movable roof panel is in the closed position and is moved from the seated position to the lifted position.

12 Claims, 6 Drawing Sheets

(56) References Cited

U.S. PATENT DOCUMENTS

| | | | | |
|---|---|---|---|---|
| 6,305,740 B1* | 10/2001 | Staser | ............... | B60J 7/043 296/216.05 |
| 6,428,090 B1* | 8/2002 | Reinsch | ............... | B60J 7/0053 296/216.08 |
| 7,114,769 B2* | 10/2006 | Storc | ............... | B60J 1/183 296/219 |
| 7,163,260 B2* | 1/2007 | Reitzloff | ............... | B60J 1/14 296/219 |
| 7,527,328 B2* | 5/2009 | Reitzloff | ............... | B60J 7/022 296/219 |
| 2003/0085594 A1* | 5/2003 | Engelgau | ............... | B60J 1/183 296/216.04 |
| 2005/0134096 A1* | 6/2005 | Fallis, III | ............... | B60J 7/0053 296/218 |
| 2005/0280290 A1* | 12/2005 | Urban | ............... | B60J 1/14 296/219 |
| 2005/0280293 A1* | 12/2005 | MacNee, III | ............... | B60J 1/14 296/219 |
| 2006/0145518 A1* | 7/2006 | Evans, Jr. | ............... | B60J 7/0573 296/223 |
| 2007/0069553 A1* | 3/2007 | Yamada | ............... | B60J 10/248 296/216.07 |

\* cited by examiner

VACUUM BLOCKER

CROSS REFERENCE TO RELATED APPLICATION

This application is a continuation of U.S. Ser. No. 14/635,414, filed Mar. 2, 2015, which claims benefit to U.S. Provisional Ser. No. 61/946,112, filed Feb. 28, 2014.

FIELD

The present disclosure relates to vacuum blocking seals for vehicle cabins.

BACKGROUND

This section provides background information related to the present disclosure which is not necessarily prior art.

Fabric or flexible roofs are typically incorporated into convertible vehicles to permit movement of the roof between an open state and a closed state. Recently, conventional or fixed-roof vehicles are incorporating large roof openings to provide vehicle occupants with an open-air feeling without requiring retraction of the vehicle roof, as is done in convertible vehicles. Such vehicles typically incorporate a fabric or other flexible roof panel that is selectively movable relative to a fixed roof panel between an open state and a closed state.

While vehicles with large roof openings and associated flexible roof panels provide vehicle occupants with an open-air feeling, such flexible roof panels are difficult to seal relative to the fixed roof panel. Inadequate sealing can lead to higher noise levels within a cabin of the vehicle and exposure to external temperatures or elements.

One source of such problems is separation of the flexible roof panel from the vehicle body at the fixed roof panel due to pressure differentials between the cabin interior and the vehicle exterior. For example, as vehicle speed increases, airflow around the vehicle exterior can create an area of low pressure relative to the interior cabin pressure at the flexible roof panel. This pressure differential can cause the flexible roof panel to lift up or balloon outward from the cabin, thereby causing gaps between the roof material and the vehicle body. These gaps can allow the relatively low pressure outside the vehicle to act as a vacuum to draw air from the cabin, which can cause a whistling or buffeting noise and, further, can lead to difficulty maintaining a desired cabin temperature. Such gaps further serve as pathways for external elements such as water or dirt which may enter the cabin during movement of the vehicle.

Traditional attempts to minimize separation of a flexible roof panel from a fixed roof panel include compressing large, resilient seals to such a degree that the seals expand and maintain contact with the fixed roof panel as the flexible roof panel lifts and the seals decompress. This expansion is due to the compressed geometry and material of the seal seeking to return to its decompressed state. Such seals are typically either too small to maintain contact with the roof during the full range of lift, or involve very large and/or complex geometries requiring a high degree of compressibility. In addition to seals, cables are generally included along a periphery of the flexible roof panel to maintain a predetermined tension in the material of the panel, thereby minimizing lifting. However, typical seal and cable solutions are prone to wear, are costly and complex to manufacture, and increase the weight and packaging size of the overall assembly.

SUMMARY

This section provides a general summary of the disclosure, and is not a comprehensive disclosure of its full scope or all of its features.

A vacuum blocker for a movable roof panel is provided and moves between an open position and a closed position and between a seated position and a lifted position when in the closed position relative to an opening formed in a fixed roof panel of a vehicle. A seal member is supported by the fixed roof panel and forms a first seal at a junction of the fixed roof panel and the movable roof panel when the movable roof panel is in the seated position. A flap extends between the seal member and the movable roof panel and forms a second seal at a junction of the seal member and the movable roof panel when the movable roof panel is in the closed position and is moved from the seated position to the lifted position. The flap moves under fluid pressure in response to movement of the movable roof panel from the seated position to the lifted position to maintain the second seal throughout a range of movement of the movable roof panel from the seated position to the lifted position.

A vehicle includes a fixed roof panel having an opening and a movable roof panel that moves between an open position and a closed position and between a seated position and a lifted position when in the closed position relative to the opening. A seal member is supported by the fixed roof panel and forms a first seal at a junction of the fixed roof panel and the movable roof panel when the movable roof panel is in the seated position. A flap extends between the seal member and the movable roof panel and forms a second seal at a junction of the seal member and the movable roof panel when the movable roof panel is in the closed position and is moved from the seated position to the lifted position. The flap moves under fluid pressure in response to movement of the movable roof panel from the seated position to the lifted position to maintain the second seal throughout a range of movement of the movable roof panel from the seated position to the lifted position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
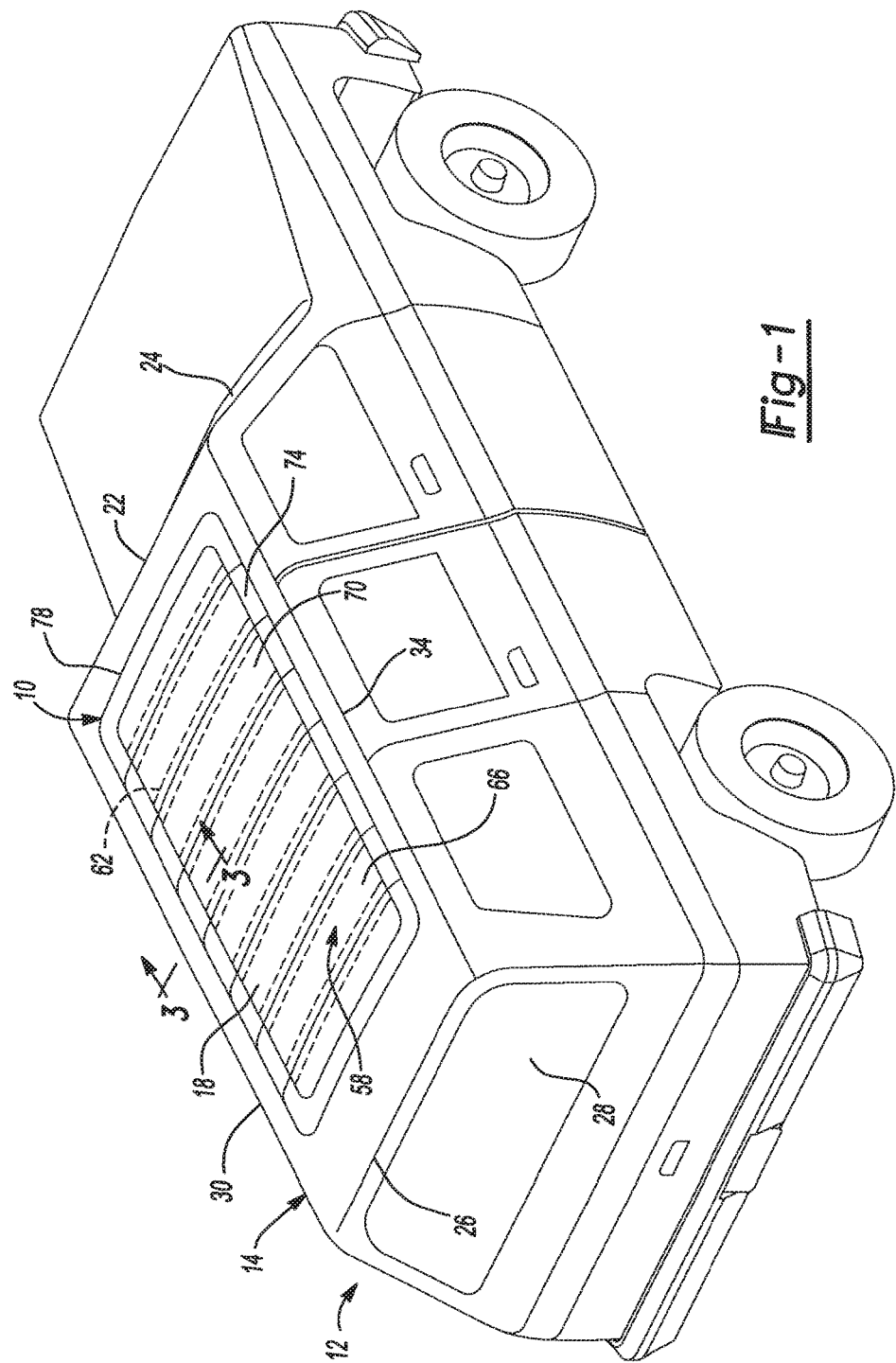
FIG. 1 is a partial perspective view of a vehicle incorporating a vehicle roof in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
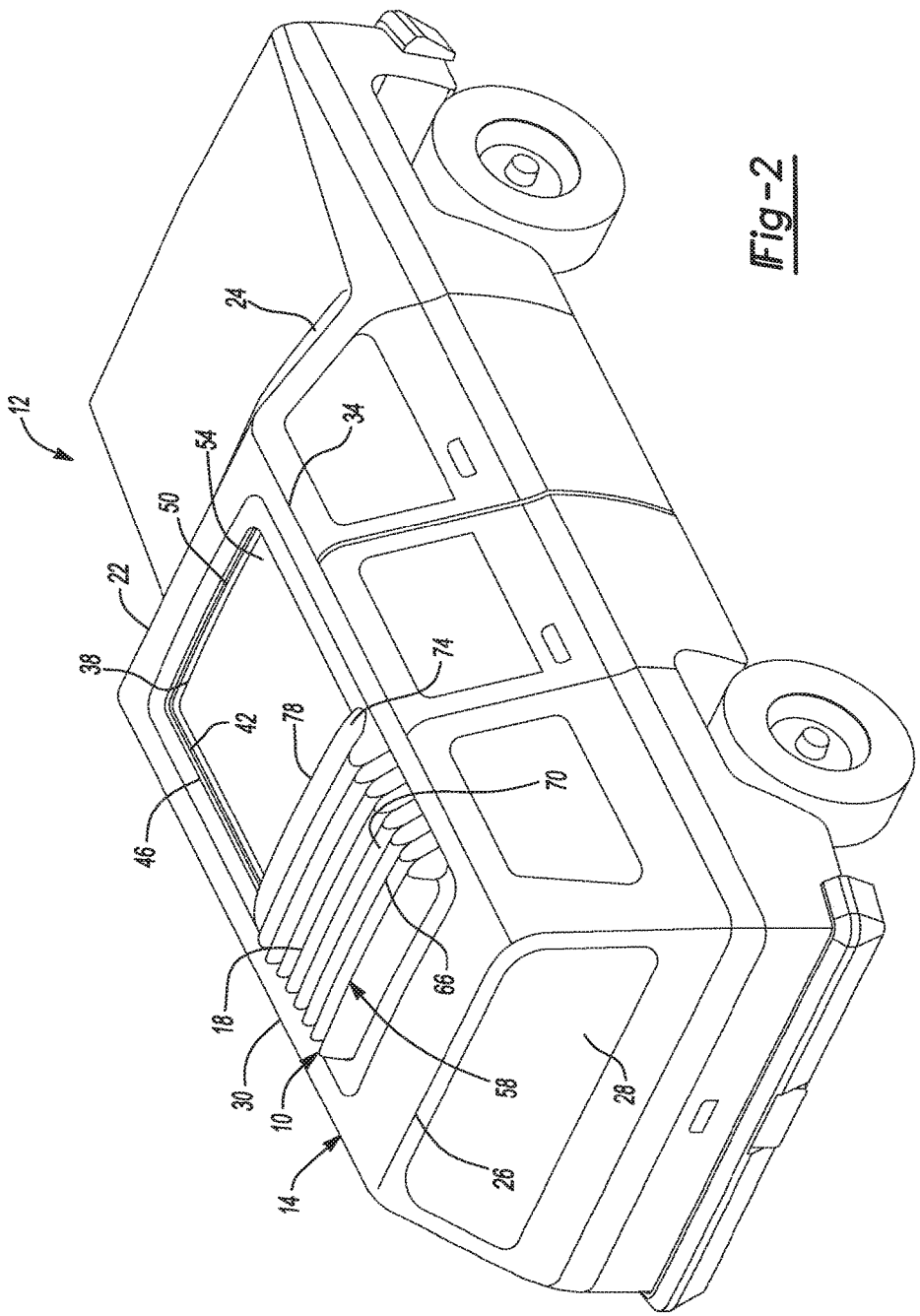
FIG. 2 is a partial perspective view of the vehicle of FIG. 1 showing the vehicle roof in a retracted or open position.

With reference to FIGS. 1 and 2, a vehicle roof 10 for a vehicle 12 is provided and includes a fixed roof panel 14 and a retractable portion 18. The vehicle roof 10 is shown with the retractable portion 18 in a closed position (FIG. 1) and with the retractable portion 18 in a retracted or open position (FIG. 2). The vehicle roof 10 generally has a front end 22 located proximate to a windshield 24, a rear end 26 located proximate to a rear window 28, and a pair of sides 30, 34 extending between the front end 22 and rear end 26.

The roof panel 14 is formed of a rigid material such as metal, rigid plastic, or a composite material, for example, and extends the length of the vehicle roof 10 from the front end 22, along the sides 30, 34, to the rear end 26. The roof panel 14 defines an aperture 38 and includes a pair of tracks 42, a pair of side sealing portions 46, and a front sealing portion 50. The aperture 38 extends through the vehicle roof 10 to a passenger compartment 54 (FIG. 2). The aperture 38 provides an open-air environment to the passenger compartment 54 when the retractable portion 18 is in the retracted or open position. Conversely, when the retractable portion 18 is in the closed position, the retractable portion 18 covers the aperture 38, thereby enclosing the passenger compartment 54.

The tracks 42 run parallel to each other and along respective ones of the sides 30, 34 of the roof panel 14. The side sealing portions 46 similarly run parallel to each other and along respective ones of the sides 30, 34 of the roof panel 14. The tracks 42 are located between the side sealing portions 46 and the aperture 38. The side sealing portions 46 will be discussed in greater detail below with regard to FIGS. 3-6. The front sealing portion 50 is located along the front end of the aperture 38 and connects the side sealing portions 46.

The retractable portion 18 is bordered by the roof panel 14 along the front and rear ends 22, 26 and along the sides 30, 34. The retractable portion 18 includes a flexible panel 58 and a plurality of supports 62 (FIG. 1). The flexible panel 58 can include a plurality of discrete panels or, alternatively, can be a single sheet 66 formed of any flexible material such as, for example, canvas, a flexible synthetic material, or a fabric having a vinyl-reinforced backing. The flexible panel 58 includes a central section 70, a peripheral section 74, and a leading edge 78 located proximate to the front end 22. The central section 70 extends across the aperture 38 when the retractable portion 18 is in the closed position. The peripheral section 74 extends from the central section 70 and over the tracks 42 to form a seal with the side sealing portions 46 when the retractable portion 18 is in the closed position, as will be discussed in greater detail below with regard to FIGS. 3-6. The leading edge 78 extends from the central section 70 toward the front end 22 and forms a seal with the front sealing portion 50.

Each support 62 extends across the aperture 38 and includes an end that is respectively coupled to the sides 30, 34 via a corresponding one of the tracks 42. The supports 62 are slidably coupled to the tracks 42 for movement along the tracks 42 to allow the retractable portion 18 to move between the closed position and the retracted or open position. The supports 62 are coupled to the central section 70 of the flexible panel 58 for movement therewith. In the closed position, the supports 62 are spaced apart along the length of the aperture 38. When the retractable portion 18 is moved from the closed position (FIG. 1) to the retracted position (FIG. 2), the supports 62 are moved along the tracks 42 toward one another to decrease the space between adjacent supports 62. As the space between supports 62 decreases, the flexible sheet 66 folds upon itself to expose the aperture 38. In moving from the retracted position to the closed position, the supports 62 move away from one another and the flexible sheet 66 unfolds until the flexible sheet 66 covers the aperture 38. The supports 62 can be moved between the closed position and the retracted position manually or, alternatively, with the assistance of a mechanism (not shown) such as a motor or hand crank, for example.

Figure 3:
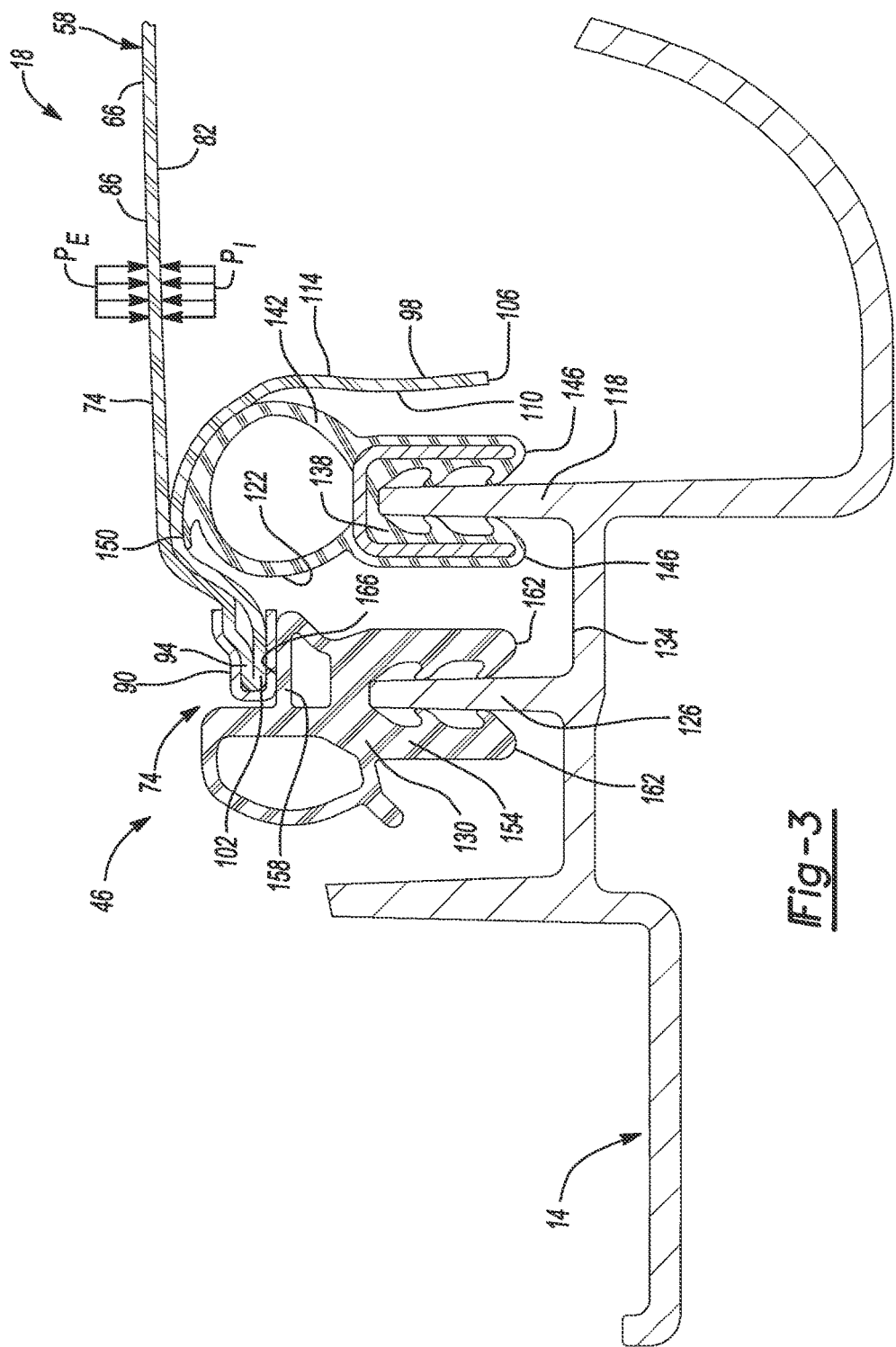
FIG. 3 is a cross-sectional view of the vehicle roof of FIG. 1 taken along line 3-3 showing a vacuum blocker in accordance with the principles of the present disclosure.
Figure 4:
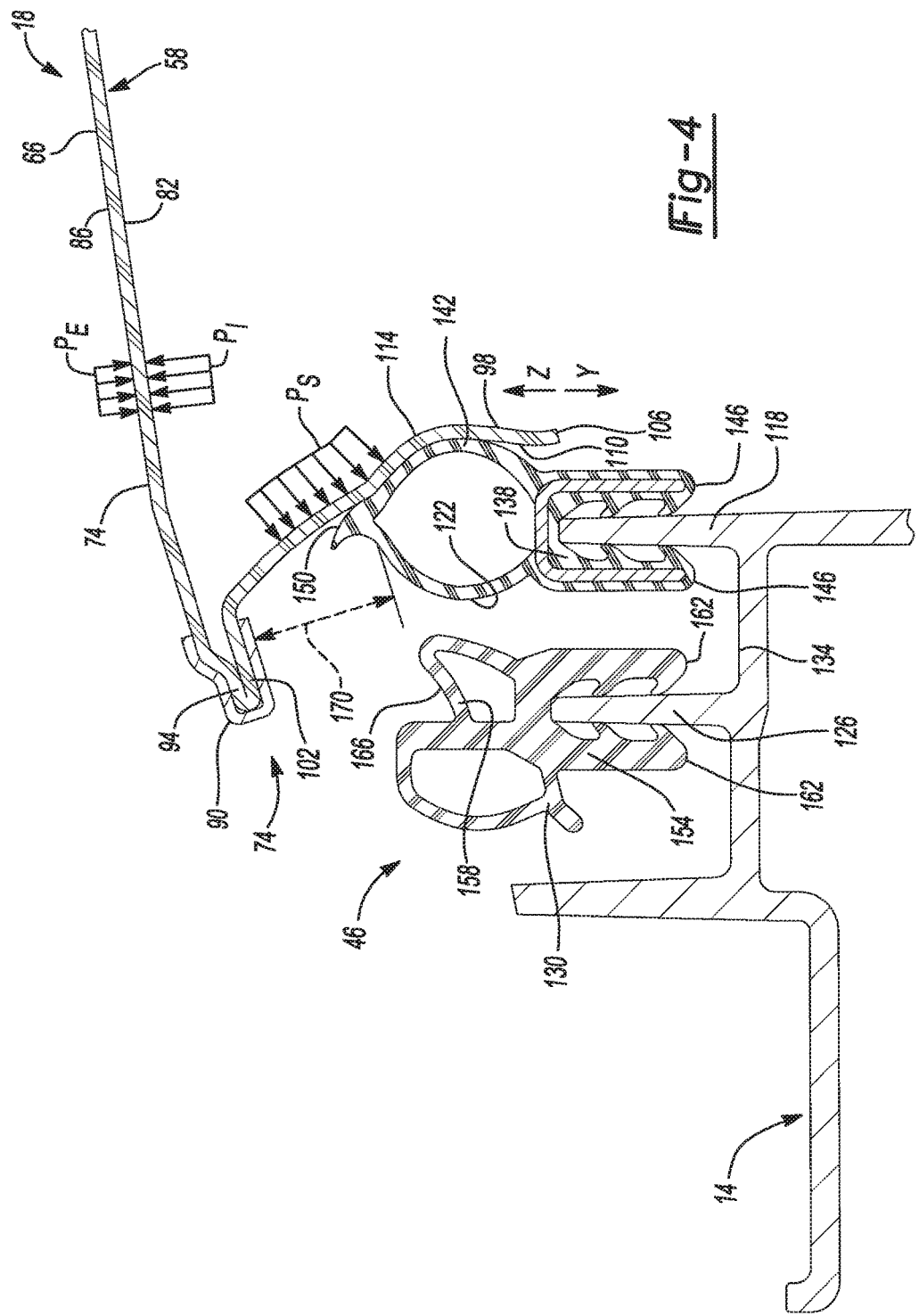
FIG. 4 is a cross-sectional view of the vehicle roof of FIG. 1 showing the vehicle roof in a lifted state.

With reference to FIGS. 3 and 4, cross-sectional views of a first configuration of the side sealing portion 46 and peripheral section 74 are illustrated. The cross-sectional views of FIGS. 3 and 4 are taken along lines 3-3 of FIG. 1. The sides 30, 34 of the vehicle roof 10 are substantially similar, and while FIGS. 3 and 4 illustrate cross-sectional views of side 30, the following description is understood to also encompass the similar features of side 34.

FIG. 3 illustrates the vehicle roof 10 with the retractable portion 18 in the closed position and with the flexible panel 58 in a seated position. The flexible panel 58 is in the seated position when a pressure differential between an interior pressure $P_I$ and an exterior pressure $P_E$ of the vehicle 12 is less than a predetermined pressure differential. The interior pressure $P_I$ is the pressure inside the passenger compartment 54 and is exerted on an interior surface 82 of the flexible sheet 66, while the exterior pressure $P_E$ is the pressure outside the vehicle 12 and is exerted on an exterior surface 86 of the flexible sheet 66.

FIG. 4 illustrates the flexible panel 58 in a lifted position. The flexible panel 58 is in the lifted position when the pressure differential between the interior pressure $P_I$ and the exterior pressure $P_E$ is greater than the predetermined pressure differential. Namely, the flexible panel 58 is moved into the lifted position when the interior pressure $P_I$ within the passenger compartment 54 exceeds the exterior pressure $P_E$ acting on the exterior surface 86 of the flexible sheet 66 by a predetermined amount.

The peripheral section 74 includes a binding member 90, an end 94 of the flexible sheet 66, and a vacuum blocker 98. The peripheral section 74 can further include a tension cable (not shown) that exerts a force on the flexible panel 58 to urge the flexible panel 58 in a direction toward the roof panel 14. The vacuum blocker 98 is formed from a flexible material such as, for example, canvas, flexible synthetic material, or vinyl-reinforced backing. The vacuum blocker 98 may extend along an entire length of the peripheral section 74 from the rear end of the peripheral section 74 to the front end of the peripheral section 74. The vacuum blocker 98 has a proximate or connected end 102, a distal or free end 106, an exterior blocker surface 110, and an interior blocker surface 114. The connected end 102 is coupled to the flexible panel 58 at the binding member 90. The vacuum blocker 98 extends freely from the connected end 102 to the free end 106. The exterior blocker surface 110 forms a seal with the side sealing portion 46, as will be described in detail below.

The interior blocker surface 114 is formed on an opposite side of the vacuum blocker 98 than the exterior blocker surface 110. The binding member 90 can be any device that finishes the end 94 of the flexible sheet 66 such as a clamp, adhesive, or a sewn seam, for example. In addition to finishing the end 94 of the flexible sheet 66, the binding member 90 couples the vacuum blocker 98 to the flexible panel 58. Alternatively, the vacuum blocker 98 can be an extension of the flexible sheet 66 such that the flexible sheet 66 and vacuum blocker 98 are a single piece of material, folded over on itself and held in place by the binding member 90. Regardless of the particular configuration of the vacuum blocker 98, the end 94 of the flexible sheet 66, and the binding member 90, the vacuum blocker 98 is free to hang below the flexible panel 58.

The side sealing portion 46 includes an inner rail 118 and an inner seal 122. In the example provided, the side sealing portion 46 also includes an outer rail 126 and an outer seal 130. The inner and outer rails 118, 126 extend along the length of the side sealing portion 46 from the rear end of the side sealing portion 46 to the front end of the side sealing portion 46. The inner and outer rails 118, 126 are spaced apart and substantially parallel to one another and extend vertically up from the roof panel 14 of the vehicle roof 10 to form a trough 134 therebetween. The inner rail 118 is located closer to the central section 70 and to the aperture 38 than the outer rail 126. Thus, the inner rail 118 is located between the outer rail 126 and the aperture 38. The trough 134 can include a drain (not shown) to allow fluid trapped in the trough 134 to escape the vehicle roof 10.

The inner seal 122 includes an inner mount 138 and an inner sealing body 142. The inner seal 122 can be formed of a molded resilient material such as a foam or rubber, for example. The inner mount 138 attaches the inner seal 122 to the inner rail 118. Namely, the inner mount 138 includes a pair of inner slats 146 that extend from the inner sealing body 142, whereby each of the pair of inner slats 146 are substantially parallel to one another, are spaced apart from one another, and straddle the inner rail 118. The pair of inner slats 146 can be spaced apart such that the inner rail 118 and the inner slats 146 form a press fit or interference fit to attach the inner seal 122 to the inner rail 118.

The inner sealing body 142 extends from the inner mount 138 between the inner rail 118 and the flexible sheet 66. The inner sealing body 142 is compressible and can include a generally hollow or tubular shape. In the example provided, the inner sealing body 142 has a generally teardrop-shaped cross-section that becomes deformed when compressed. The inner sealing body 142 has a first sealing surface 150. When in the seated position, the inner sealing body 142 is compressed by the peripheral section 74. In this position, the vacuum blocker 98 is pressed between the flexible sheet 66 and the first sealing surface 150 to form a seal therebetween. In this position, compression of the inner sealing body 142 forms and maintains the seal between the inner seal 122 and the peripheral section 74 of the flexible panel 58.

The outer seal 130 includes an outer mount 154 and an outer sealing body 158. The outer seal 130 can be formed of a molded resilient material such as a foam or rubber, for example. The outer mount 154 attaches the outer seal 130 to the outer rail 126. Namely, the outer mount 154 includes a pair of outer slats 162 that extend from the outer sealing body 158, whereby each of the pair of outer slats 162 are substantially parallel to one another, are spaced apart from one another, and straddle the outer rail 126. The pair of outer slats 162 can be spaced apart such that the outer rail 126 and the outer slats 162 form a press fit or interference fit to attach the outer seal 130 to the outer rail 126.

The outer sealing body 158 extends from the outer mount 154, between the outer rail 126 and the flexible sheet 66. The outer sealing body 158 is compressible and can include a generally hollow or tubular shape. In the example provided, the outer sealing body 158 has an irregular, tubular shaped cross-section that extends at an angle up from the outer mount 154 and flattens when compressed. The outer sealing body 158 has a second sealing surface 166 that, when in the seated position (FIG. 3), is compressed by the peripheral section 74. In this position, the second sealing surface 166 forms a seal with the peripheral section 74 proximate to the binding member 90, whereby compression of the outer sealing body 158 acts to form and maintain the seal between the outer seal 130 and the peripheral section 74 of the flexible panel 58.

As the pressure differential between the interior pressure $P_I$ and the exterior pressure $P_E$ increases, the flexible panel 58 is moved from the seated position (FIG. 3) to the lifted position (FIG. 4). As the flexible panel 58 moves toward the lifted position, the inner and outer seals 122, 130 begin to decompress (i.e., expand) and maintain sealing contact with the flexible panel 58 until fully decompressed or expanded. If the pressure differential continues to rise after the inner and outer seals 122, 130 have fully decompressed, the flexible panel 58 moves to the lifted position. In the lifted position, the flexible panel 58 no longer presses against the inner and outer seals 122, 130 to form a seal therebetween. In this position, the pressure differential creates a suction pressure $P_s$ (FIG. 4) that attempts to draw air from the passenger compartment 54 to the vehicle exterior through a gap 170 between the inner and outer seals 122, 130 and the flexible sheet 66.

The suction pressure $P_s$ holds the vacuum blocker 98 against the inner sealing body 142 to prevent air from being drawn from the passenger compartment 54 to the vehicle exterior through the gap 170. The vacuum blocker 98 also limits penetration of exterior elements such as noise, water, or dirt, for example, into the passenger compartment 54. The vacuum blocker 98 is of sufficient length to allow the flexible panel 58 to lift a maximum height or distance away from the roof panel 14 during vehicle operation while the suction pressure $P_s$ maintains contact between the vacuum blocker 98 and the inner seal 122. Accordingly, when in the seated position, the vacuum blocker 98 drapes down toward the passenger compartment 54 and can hang below the inner sealing body 142. After full decompression of the inner seal 122 and as the flexible panel 58 lifts toward the lifted position, the connected end 102 of the vacuum blocker 98 is pulled up with the flexible sheet 66 in the direction (Z; FIG. 4). The exterior blocker surface 110 slides along the inner sealing body 142 while the suction pressure $P_S$ (i.e., fluid pressure) maintains sealing contact between the vacuum blocker 98 and the inner seal 122. In one configuration, the maximum amount of travel of the flexible panel 58 into the lifted position is approximately between 12 mm and 20 mm. Accordingly, the vacuum blocker 98 may include a length of approximately 35 mm to maintain contact with the inner sealing body 142 throughout the range of motion of the flexible panel 58 into the lifted position.

The vacuum blocker 98 is of sufficient length and stiffness such that the suction pressure $P_S$, during normal vehicle operation, is insufficient to force the vacuum blocker 98 to be entirely sucked or moved out of the gap 170 between the flexible sheet 66 and the inner seal 122. As the pressure differential decreases below the predetermined pressure, the flexible panel 58 and vacuum blocker 98 move toward the seated position until fully seated. As the flexible panel 58 returns to the seated position, exterior blocker surface 110 slides back down the inner sealing body 142 in the direction (Y)—opposite to direction (Z)—until compression of the inner sealing body 142 takes over to form the seal between the inner seal 122 and the flexible panel 58 and the flexible panel 58 returns to the seated position.

Figure 5:
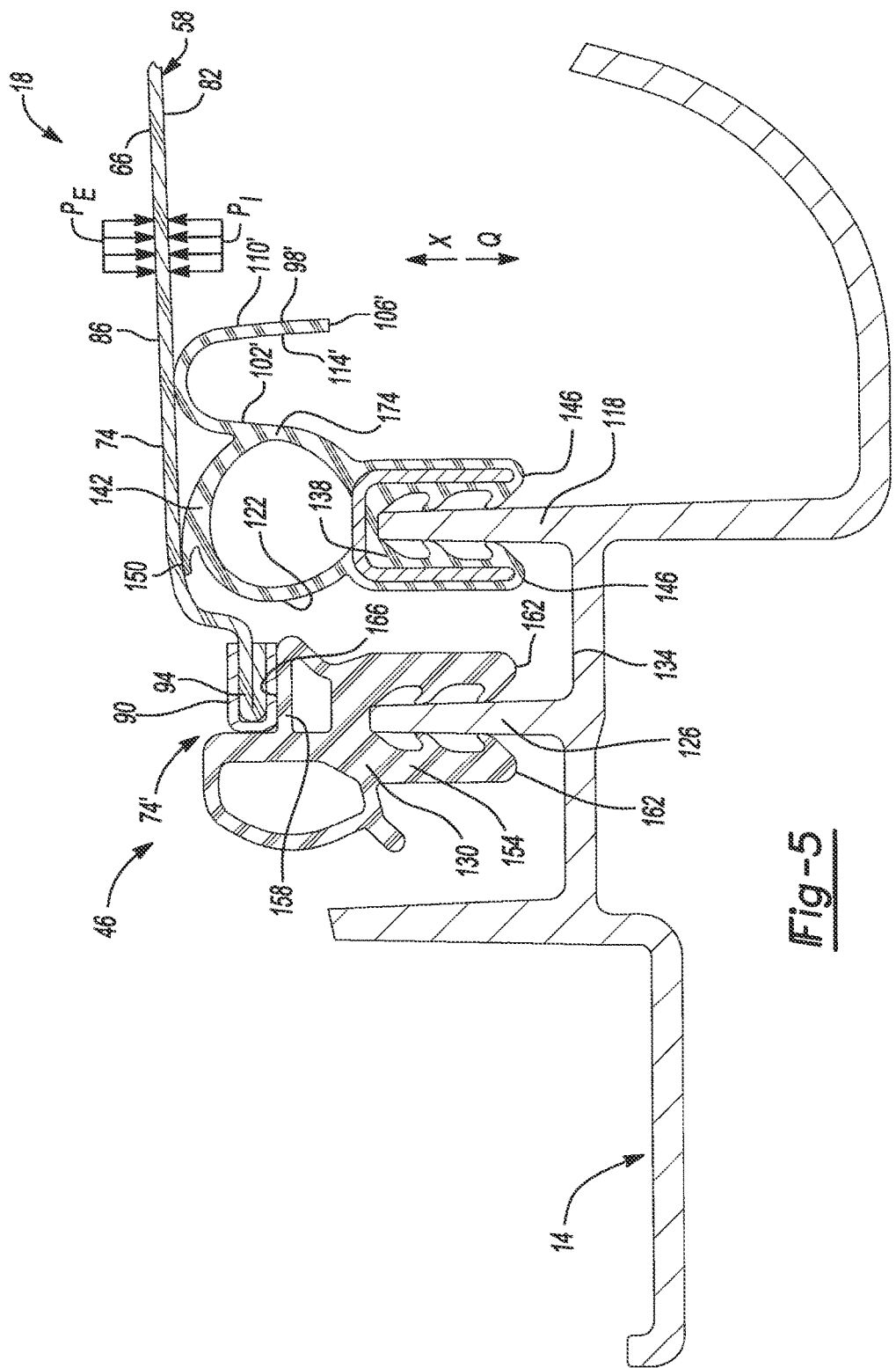
FIG. 5 is a cross-sectional view of a vehicle roof in accordance with the principles of the present disclosure showing another vacuum blocker in accordance with the principles of the present disclosure.
Figure 6:
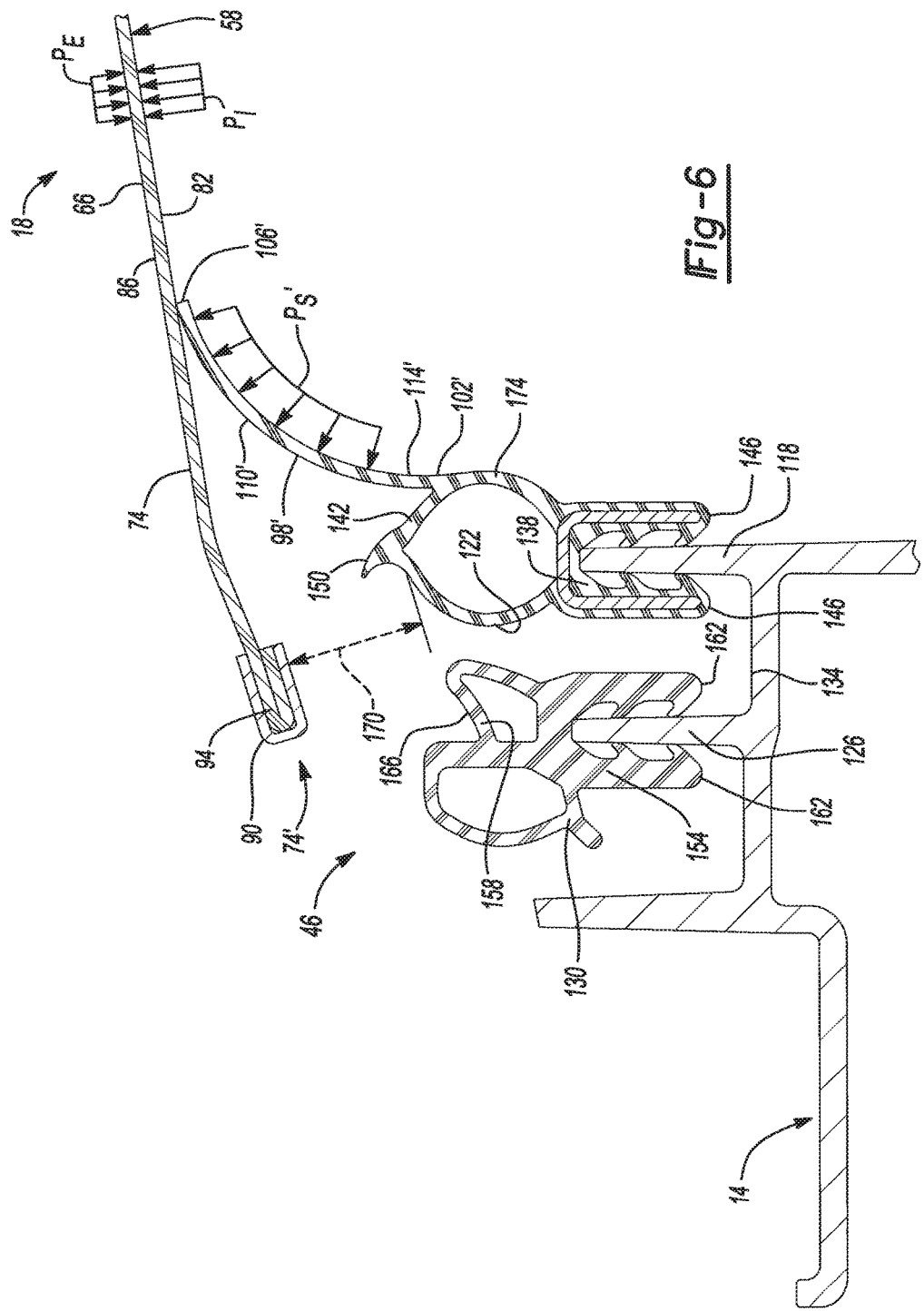
FIG. 6 is a cross-sectional view showing the vehicle roof of FIG. 5 in a lifted state.

With reference to FIGS. 5 and 6, a cross-sectional view of another peripheral section 74' is illustrated. As with the peripheral section 74, the peripheral section 74' may be used with the vehicle 12 and would be used in place of the peripheral section 74 of the vehicle roof 10. Accordingly, the cross-sectional views of FIGS. 5 and 6 are taken in a similar location as line 3-3 of FIG. 1.

The sides 30, 34 of the vehicle roof 10 are substantially similar, and while FIGS. 5 and 6 illustrate section views of side 30 of the vehicle roof 10, the following description also encompasses the similar features of side 34 of the vehicle roof 10.

In view of the substantial similarity in structure and function of the components associated with the peripheral section 74 with respect to the peripheral section 74', like reference numerals are used hereinafter and in the drawings to identify like components while like reference numerals containing an apostrophe (') are used to identify those components that have been modified.

FIG. 5 illustrates the vehicle roof 10 with the retractable portion 18 in the closed position and with the flexible panel 58 in a seated position.

FIG. 6 illustrates the vehicle roof 10 of FIG. 5 with the flexible panel 58 in the lifted position.

The peripheral section 74' includes the binding member 90 and a vacuum blocker 98'. The vacuum blocker 98' is mounted to the inner sealing body 142 and may be integrally formed or molded to the inner sealing body 142. For example and in one configuration, the vacuum blocker 98' is mounted to an interior side 174 of the inner sealing body 142 and extends upward therefrom toward the flexible sheet 66. The vacuum blocker 98' extends the length of the side sealing portion 46 from the rear end of the side sealing portion 46 to the front end of the side sealing portion 46. The vacuum blocker 98' has a proximate, or connected end 102', a distal or free end 106', an exterior blocker surface 110', and an interior blocker surface 114'. The connected end 102' is coupled to the inner sealing body 142. The vacuum blocker 98' extends freely from the connected end 102' to the free end 106'. The exterior blocker surface 110' forms a seal with the flexible panel 58, as will be described in detail below. The interior blocker surface 114' is formed on an opposite side of the vacuum blocker 98' than the exterior blocker surface 110'.

In the seated position, the flexible sheet 66 directly contacts the inner seal 122 to compress the inner sealing body 142 and form a seal between the first sealing surface 150 and the interior surface 82 of the flexible sheet 66 (FIG. 5). In this position, the vacuum blocker 98' extends from the interior side 174 of the inner sealing body 142 toward the flexible sheet 66 and, in fact, contacts the interior surface 82 of the flexible sheet 66 at the exterior blocker surface 110'. In the present example, the vacuum blocker 98' extends vertically, toward the flexible sheet 66 when the flexible panel 58 is in the seated position. The vacuum blocker 98' contacts the flexible sheet 66 as the vacuum blocker 98' is biased in a direction (X; FIG. 5) toward the interior surface 82 of the flexible sheet 66. Thus, in the seated position, the vacuum blocker 98' is compressed down by the flexible sheet 66. The free end 106' of the vacuum blocker 78' is free to hang down from the flexible sheet 66 and toward the passenger compartment 54 in a direction (Q; FIG. 5) that is opposite to direction (X). In this position, compression of the inner sealing body 142 along with the vacuum blocker 98' acts to form and maintain the seal between the inner seal 122 and the peripheral section 74' of the flexible panel 58.

As the pressure differential between the interior pressure $P_I$ and the exterior pressure $P_E$ increases, the flexible panel 58 is moved from the seated position to the lifted position (FIG. 6). As the flexible panel 58 moves toward the lifted position, the inner and outer seals 122, 130 begin to decompress or expand and maintain sealing contact with the flexible panel 58 until fully decompressed or expanded. If the pressure differential continues to rise above a threshold or predetermined value, the flexible panel 58 moves to the lifted position and both of the seals 122, 130 may be disengaged from the flexible panel 58.

In the lifted position, the flexible sheet 66 is no longer pressing against the inner and outer seals 122, 130 or the vacuum blocker 98' to form a seal therebetween. In this position, the pressure differential creates a suction pressure $P_S'$ that attempts to draw air from the passenger compartment 54 to the vehicle exterior through the gap 170 between the inner and outer seals 122, 130 and the flexible sheet 66. The suction pressure $P_S'$ holds the vacuum blocker 98' against the interior surface 82 of the flexible sheet 66 to prevent air from being drawn from the passenger compartment 54 to the vehicle exterior through the gap 170. The vacuum blocker 98' also limits penetration of exterior elements such as noise, water, or dirt, for example, into the passenger compartment 54. The vacuum blocker 98' is of sufficient length to allow the flexible panel 58 to lift the maximum height possible during vehicle operation while the vacuum blocker 98' maintains contact with the interior surface 82 of the flexible sheet 66.

As the cover lifts toward the lifted position and after full decompression of the inner seal 122, the exterior blocker surface 110' of the vacuum blocker 98' moves along the interior surface 82 of the flexible sheet 66 while the suction pressure $P_S'$ maintains sealing contact between the vacuum blocker 98' and the interior surface 82. In one configuration, the maximum amount of travel of the flexible panel 58 is approximately between 12 mm and 20 mm. Accordingly, the vacuum blocker 98' may include a length of approximately 35 mm to maintain contact with the interior surface 82 throughout the range of motion of the flexible panel 58 into the lifted position.

The vacuum blocker 98' is of sufficient length and stiffness such that the suction pressure $P_S'$, during normal vehicle operation, is insufficient to force the vacuum blocker 98' to be entirely sucked out of the gap 170 between the flexible sheet 66 and the inner seal 122. As the pressure differential decreases below the predetermined pressure, the flexible panel 58 and vacuum blocker 98' then move toward the seated position in the direction (O) until fully seated. As the flexible panel 58 returns to the seated position, exterior blocker surface 110' moves back along the interior surface 82 of the flexible sheet 66 until compression of the inner sealing body 142 takes over to form the seal between the inner seal 122 and the flexible panel 58 along with the exterior blocker surface 110'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vacuum blocker for a movable roof panel movable between an open position and a closed position and between a seated position and a lifted position when in the closed position relative to an opening formed in a fixed roof panel of a vehicle, the vacuum blocker comprising:
    a seal member supported by the fixed roof panel and operable to form a first seal at a junction of the fixed roof panel and the movable roof panel when the movable roof panel is in the seated position; and
    a flap extending between said seal member and the movable roof panel and affixed to the movable roof panel, the flap extending down from the movable roof panel and including a sealing surface in contact with the seal member and operable to form a second seal at a junction of said seal member and sealing surface of the flap when the movable roof panel is in the closed position and is moved from the seated position to the lifted position, said flap moving in response to movement of the movable roof panel from the seated position to the lifted position to maintain said second seal throughout a range of movement of the movable roof panel from the seated position to the lifted position wherein said sealing surface is in contact with said seal member throughout said range of movement of the movable roof panel from the seated position to the lifted position and slides along said seal member when the movable roof panel is moved between the seated position and the lifted position.

2. The vacuum blocker of claim 1, wherein said flap is in contact with said seal member and the movable roof panel when the movable roof panel is in the seated position, said flap being compressed between said seal member and the movable roof panel when the movable roof panel is in the seated position.

3. The vacuum blocker of claim 1, wherein said flap is urged into engagement with the movable roof panel by said seal member when the movable roof panel is in the seated position.

4. The vacuum blocker of claim 1, wherein said flap is affixed to the movable roof panel by a binding member, said binding member disposed at an outboard edge of the movable roof panel.

5. A vacuum blocker for a movable roof panel movable between an open position and a closed position and between a seated position and a lifted position when in the closed position relative to an opening formed in a fixed roof panel of a vehicle, the vacuum blocker comprising:
    a seal member supported by the fixed roof panel and operable to form a first seal at a junction of the fixed roof panel and the movable roof panel when the movable roof panel is in the seated position; and
    a flap extending between said seal member and the movable roof panel and affixed to the seal member and operable to form a second seal at a junction of the moveable roof panel and sealing surface of the flap when the movable roof panel is in the closed position and is moved from the seated position to the lifted position, said flap moving in response to movement of the movable roof panel from the seated position to the lifted position to maintain said second seal throughout a range of movement of the movable roof panel from the seated position to the lifted position wherein the sealing surface of the flap is in contact with the movable roof panel throughout said range of movement of the movable roof panel from the seated position to the lifted position and slides along the movable roof panel when the movable roof panel is moved between the seated position and the lifted position.

6. The vacuum blocker of claim 5, wherein said flap is formed from a flexible material that biases said flap into engagement with the movable roof panel.

7. The vacuum blocker of claim 6, wherein said flap is integrally formed with and extends from said seal member.

8. The vacuum blocker of claim 7, wherein said flap extends from said seal member toward the movable roof panel.

9. A vehicle comprising:
a fixed roof panel having an opening;
a movable roof panel movable between an open position and a closed position and between a seated position and a lifted position when in the closed position relative to said opening:
a seal member supported by said fixed roof panel and operable to form a first seal at a junction of said fixed roof panel and said movable roof panel when said movable roof panel is in said seated position; and
a flap extending between said seal member and said movable roof panel and affixed to the movable roof panel, the flap extending down from the movable roof panel and including a sealing surface in contact with the seal member and operable to form a second seal at a junction of said seal member and sealing surface of the flap when said movable roof panel is in said closed position and is moved from said seated position to said lifted position, said flap moving under fluid pressure in response to movement of said movable roof panel from said seated position to said lifted position to maintain said second seal throughout a range of movement of said movable roof panel from said seated position to said lifted position wherein said sealing surface is in contact with said seal member throughout said range of movement of the movable roof panel from the seated position to the lifted position and slides along said seal member when the movable roof panel is moved between the seated position and the lifted position.

10. A vehicle comprising:
a fixed roof panel having an opening;
a movable roof panel movable between an open position and a closed position and between a seated position and a lifted position when in the closed position relative to said opening:
a seal member supported by said fixed roof panel and operable to form a first seal at a junction of said fixed roof panel and said movable roof panel when said movable roof panel is in said seated position; and
a flap extending between said seal member and the movable roof panel and affixed to the seal member and operable to form a second seal at a junction of the moveable roof panel and sealing surface of the flap wherein the sealing surface of the flap is in contact with the movable roof panel throughout said range of movement of the movable roof panel from the seated position to the lifted position and slides along the movable roof panel when the movable roof panel is moved between the seated position and the lifted position.

11. The vehicle of claim 10, wherein said flap is formed from a flexible material that biases said flap into engagement with the movable roof panel.

12. The vehicle of claim 11, wherein said flap is integrally formed with and extends from said seal member toward the movable roof panel.

* * * * *